(12) United States Patent
Sekine et al.

(10) Patent No.: US 10,746,224 B2
(45) Date of Patent: Aug. 18, 2020

(54) SLIDE BEARING

(71) Applicant: OILES CORPORATION, Tokyo (JP)

(72) Inventors: Toshihiko Sekine, Fujisawa (JP);
Tomohiro Yamada, Fujisawa (JP);
Katsunori Saito, Fujisawa (JP);
Yoshiteru Iagarashi, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 0 days.

(21) Appl. No.: 16/318,834

(22) PCT Filed: Jul. 18, 2017

(86) PCT No.: PCT/JP2017/025998
§ 371 (c)(1),
(2) Date: Jan. 18, 2019

(87) PCT Pub. No.: WO2018/016500
PCT Pub. Date: Jan. 25, 2018

(65) Prior Publication Data
US 2019/0277336 A1     Sep. 12, 2019

(30) Foreign Application Priority Data
Jul. 19, 2016   (JP) .................................. 2016-141651

(51) Int. Cl.
*F16C 33/20*      (2006.01)
*F16C 17/04*      (2006.01)
(Continued)

(52) U.S. Cl.
CPC ............ *F16C 33/20* (2013.01); *B60G 15/067* (2013.01); *B60G 15/068* (2013.01); *F16C 17/04* (2013.01);
(Continued)

(58) Field of Classification Search
CPC .... F16C 2326/05; F16C 33/10; F16C 33/102; F16C 33/74; F16C 17/10; F16C 33/20; F16C 17/04; B60G 15/068; B60G 15/067
See application file for complete search history.

(56) References Cited

U.S. PATENT DOCUMENTS 8,708,568 B2 *   4/2014   Morishige ................ F16C 17/04
                                                        384/420
9,381,784 B2 *   7/2016   Stautner ................. F16C 33/208
(Continued)

FOREIGN PATENT DOCUMENTS

CN         102143849         8/2011
CN         103026083         4/2013
(Continued)

OTHER PUBLICATIONS

International Search Report for PCT/JP2017/025998 dated Oct. 3, 2017, 5 pages.
(Continued)

Primary Examiner — Alan B Waits
(74) Attorney, Agent, or Firm — Nixon & Vanderhye P.C.

(57) ABSTRACT

Provided is a slide bearing of lower cost that is capable of preventing the intrusion of dust, muddy water, etc. and has good sliding performance. In a ring-shaped space (5) formed by assembling an upper case (2) with a lower case, a ring-shaped outer dust seal part (42), which bends with one end (420) contacting the upper case (2) and the other end (421) contacting the lower case, is disposed on the outside of a ring-shaped thrust bearing part (40), and the outer dust seal part (42) is connected to the thrust bearing part (40) by connecting parts (43) that extend radially outward from the outside of the thrust bearing part (40), integrating the two as a dust seal-integrated center plate (4). Disposed between the thrust bearing part (40) and the upper case (2) is a ring-
(Continued)

shaped lubrication sheet (6), which has surfaces (62, 63) that slide on the mating surfaces facing same.

20 Claims, 12 Drawing Sheets

(51) Int. Cl.
    *F16C 17/10*     (2006.01)
    *F16C 33/74*     (2006.01)
    *B60G 15/06*     (2006.01)
    *F16C 33/10*     (2006.01)

(52) U.S. Cl.
    CPC .............. *F16C 17/10* (2013.01); *F16C 33/10* (2013.01); *F16C 33/74* (2013.01); *F16C 2326/05* (2013.01)

(56) References Cited

U.S. PATENT DOCUMENTS

| | | | | |
|---|---|---|---|---|
| 10,428,866 | B2* | 10/2019 | Yamada | ................... F16C 17/04 |
| 2006/0215944 | A1 | 9/2006 | Watai et al. | |
| 2007/0237439 | A1 | 10/2007 | Watai et al. | |
| 2008/0310780 | A1* | 12/2008 | Watai | ................... B60G 15/068 384/420 |
| 2013/0142462 | A1 | 6/2013 | Morishige et al. | |
| 2013/0322798 | A1 | 12/2013 | Morishige et al. | |
| 2014/0044384 | A1* | 2/2014 | Trotter | ................. B60G 15/067 384/137 |
| 2014/0199007 | A1 | 7/2014 | Morishige et al. | |
| 2014/0355916 | A1 | 12/2014 | Morishige et al. | |
| 2015/0367698 | A1 | 12/2015 | Stautner et al. | |
| 2016/0312896 | A1* | 10/2016 | Perratone | ............. F16J 15/3236 |

FOREIGN PATENT DOCUMENTS

| | | |
|---|---|---|
| CN | 104936806 | 9/2015 |
| EP | 1 548 303 | 6/2005 |
| JP | 59-27347 | 2/1984 |
| JP | 60-161737 | 10/1985 |
| JP | 2012-172814 | 9/2012 |
| JP | 2014-190427 | 10/2014 |
| WO | 2004/031601 | 4/2004 |
| WO | WO 2008/139739 | 11/2008 |
| WO | 2012/017591 | 2/2012 |
| WO | WO 2015/199022 | 12/2015 |
| WO | 2016/088782 | 6/2016 |

OTHER PUBLICATIONS

Search Report issued in CN Appln. No. 2017800399846 dated Dec. 25, 2019 (w/ translation).
Search Report issued in EP Appln. No. 17831016.5 dated Feb. 10, 2020.

* cited by examiner

SLIDE BEARING

This application is the U.S. national phase of International Application No. PCT/JP2017/025998 filed Jul. 18, 2017 which designated the U.S. and claims priority to JP Patent Application No. 2016-141651 filed Jul. 19, 2016, the entire contents of each of which are hereby incorporated by reference.

TECHNICAL FIELD

The present invention relates to a slide bearing for supporting a load of an object to be supported, and in particular to a slide bearing for supporting a vehicle body's load applied to a suspension.

BACKGROUND ART

A strut type suspension used for a front wheel of an automobile has structure in which a strut assembly comprising a piston rod and a hydraulic shock absorber is combined with a coil spring. When a steering is operated, the strut assembly is rotated together with the coil spring. Accordingly, to support a load applied to the strut type suspension while allowing smooth rotation of the strut assembly, usually a bearing is placed between an upper mount which is a mounting mechanism for mounting the strut assembly onto the automobile body, and an upper spring seat which is a spring seat for the upper end of the coil spring.

For example, the Patent Literature 1 discloses a slide bearing of synthetic resin as a bearing for a strut type suspension. This slide bearing comprises: an upper case of synthetic resin which is mounted on the side of an upper mount; a lower case of synthetic resin which is mounted on the side of an upper spring seat and is rotatably combined with the upper case; and a center plate of synthetic resin for smooth rotation between the upper case and the lower case. Here, a plurality of grooves functioning as lubricating grease reservoir are formed in a bearing surface of the center plate, and these grooves are filled with lubricating grease. Further, a dust seal is located in a ring-shaped space so as to close a gap which is formed between the upper case and the lower case and leads to the ring-shaped space.

According to the slide bearing of synthetic resin described in the Patent Literature 1: the gap which is formed by combining the upper case and the lower case and leads to the outside of the ring-shaped space is closed; intrusion of dust, muddy water, or the like into the ring-shaped space can be prevented even under severe conditions; and thus it is possible to prevent deterioration of sliding performance owing to intrusion of dust, muddy water, or the like onto the bearing surface of the center plate placed in the ring-shaped space.

CITATION LIST

Patent Literature

Patent Literature 1: Japanese Unexamined Patent Application Laid-Open No. 2012-172814

SUMMARY OF INVENTION

Technical Problem

In the slide bearing of synthetic resin described in the Patent Literature 1, the dust seal comprises a cylindrical seal body and a ring-shaped lip part formed integrally with the seal body. In order to close the gap between the upper case and the lower case which leads to the ring-shaped space by contacting the lip part with a wall surface of the ring-shaped space, the dust seal is made of elastic material such as polyurethane resin, polyester elastomer, synthetic rubber, or the like. Further, to make the lip part come in contact with the wall surface of the ring-shaped space with appropriate force so that sealing performance is improved, a metal core is embedded in the seal body to increase the rigidity of the seal body. The slide bearing of synthetic resin described in the Patent Literature 1 requires addition of the dust seal having this metal core, and thus has a problem of cost increase. This problem occurs not only in a strut type suspension but also in a suspension of another type such as a double wishbone type suspension, a multilink type suspension, an air suspension, or the like.

The present invention has been made taking the above conditions into consideration, and an object of the present invention is to provide a slide bearing which can prevent intrusion of dust, muddy water, or the like at low cost and, at the same time, has superior sliding performance.

Solution to Problem

To solve the above problems, the present invention provides a slide bearing, in which a ring-shaped outer dust seal whose one end is abutted against an upper case or a lower case is positioned on the outer peripheral side of a ring-shaped center plate placed between the upper case and the lower case. Here, the upper case and the lower case are combined rotatably. The center plate and the outer dust seal are formed integrally, by connecting the outer dust seal with the center plate by a connecting part that extends outward in the radial direction from the outer peripheral side of the center plate. Further, a ring-shaped lubricating sheet having a sliding surface which slides on a counter surface facing the lubricating sheet is placed between the center plate and the upper case and/or between the center plate and the lower case.

For example, the present invention provides a slide bearing, comprising:

an upper case;

a lower case which is rotatably combined with the upper case;

a ring-shaped center plate which is placed between the upper case and the lower case;

a ring-shaped outer dust seal which is positioned on an outer peripheral side of the center plate; and a ring-shaped lubricating sheet which is placed between the center plate and the upper case and/or between the center plate and the lower case;

wherein:

one end of the outer dust seal abuts against the upper case or the lower case;

the center plate has a connecting part which extends outward in a radial direction from the outer peripheral side of the center plate and connects with the outer dust seal; and at least one of front and back surfaces of the lubricating sheet has a sliding surface which slides on a counter surface facing the lubricating sheet.

Here, the slide bearing may be, for example, one which supports a load of a vehicle body applied to a strut type suspension while allowing rotation of a strut-assembly of the strut type suspension, wherein:

the upper case is mounted onto a mounting mechanism for mounting the strut assembly onto the vehicle body, in a state that the strut assembly is inserted in the upper case; and the lower case is fixed to a spring seat at an upper end of a coil spring combined with the strut assembly, in a state that the strut assembly is inserted in the lower case.

Advantageous Effects of Invention

According to the present invention, the ring-shaped outer dust seal whose one end abuts against the upper case or the lower case is positioned on the outer peripheral side of the ring-shaped center plate placed between the upper case and the lower case, which are rotatably combined with each other, and the outer dust seal is formed integrally with the center plate. Accordingly, without embedding a metal core in the outer dust seal to increase the rigidity, it is possible to obtain sufficient sealing performance to close the gap formed between the upper case and the lower case between which the center plate is placed, owing to reaction force generated when the outer dust seal is deflected by the load of the object to be supported applied in the axial direction. Further, it is not necessary to prepare the outer dust seal as a separate part, and accordingly cost can be reduced. Further, in the present invention, the lubricating sheet is placed between the center plate and the upper case and/or between the center plate and the lower case, and thus it is possible to realize superior sliding performance even in the case where, for example, elastic material is used as material of the outer dust seal and material of the center plate formed integrally with the outer dust seal to give elasticity to the outer dust seal. Thus, according to the present invention, it is possible to prevent intrusion of dust, muddy water, or the like at lower cost and to realize superior sliding performance.

DESCRIPTION OF EMBODIMENTS

In the following, one embodiment of the present invention will be described.

Figure 1:
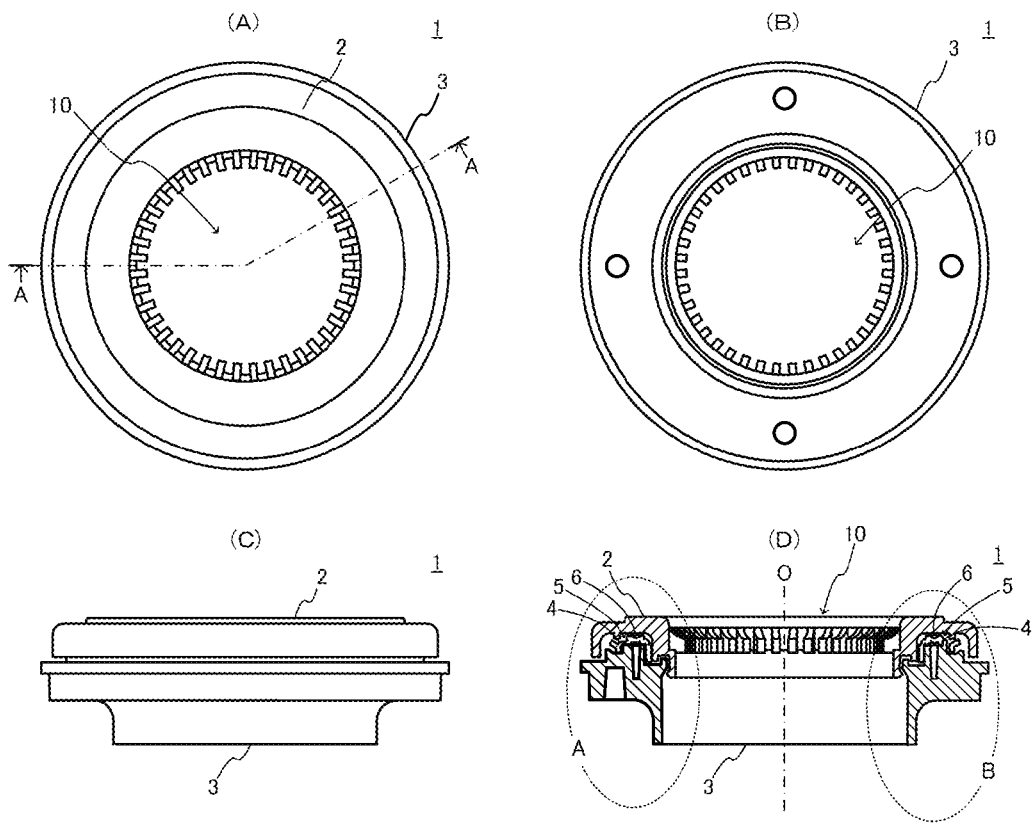
FIGS. 1(A), 1(B), and 1(C) are respectively a plan view, a bottom view, and a front view of a slide bearing 1 according to an embodiment of the present invention.
FIG. 1(D) is an A-A cross-section view of the slide bearing 1 shown in FIG. 1(A)

FIGS. 1(A), 1(B) and 1(C) are respectively a plan view, a bottom view, and a front view of a slide bearing 1 according to the present embodiment, and FIG. 1(D) is an A-A cross-section view of the slide bearing 1 shown in FIG. 1(A). Further, FIG. 2(A) is an enlarged view of the part A of the slide bearing 1 shown in FIG. 1(D), and FIG. 2(B) is an enlarged view of the part B of the slide bearing 1 shown in FIG. 1(D).

The slide bearing 1 of the present embodiment has a receiving hole 10 for receiving a strut assembly (not shown) of a strut type suspension, and supports a load of a vehicle body applied to the strut type suspension while allowing rotation of the strut assembly received in the receiving hole 10. As shown in the figures, the slide bearing 1 comprises: an upper case 2; a lower case 3 which is rotatably combined with the upper case 2, to form a ring-shaped space 5 between the lower case 3 and the upper case 2; a dust-seal-integrated center plate 4 which is placed in the ring-shaped space 5; and a lubricating sheet which is placed between the upper case 2 and the dust-seal-integrated center plate 4; and, although not shown, lubricating grease which is filled in the ring-shaped space 5.

The upper case 2 is formed of thermoplastic resin superior in sliding characteristics such as polyacetal resin impregnated with lubricating oil as needed. The upper case 2 is mounted on an upper support 503 as a mounting mechanism for the strut assembly of the strut type suspension onto the vehicle body in a state that the strut assembly is inserted in the upper case 2.

Figure 3:
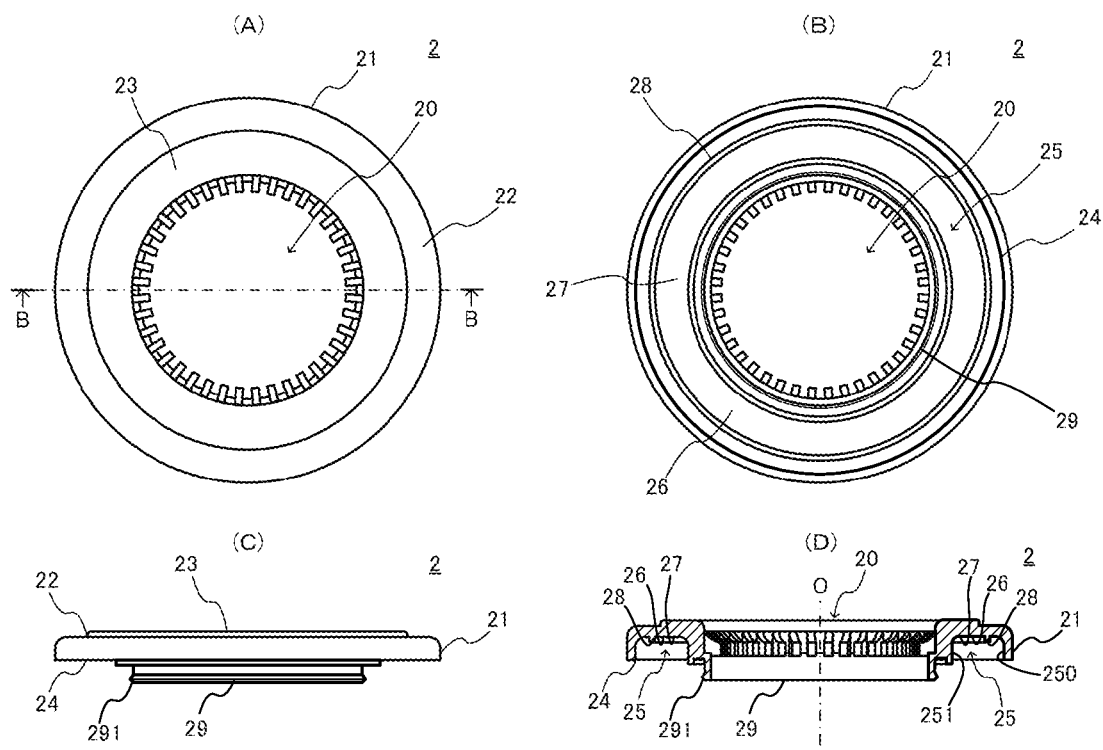
FIGS. 3(A), 3(B), and 3(C) are respectively a plan view, a bottom view, and a front view of an upper case 2.
FIG. 3(D) is a B-B cross-section view of the upper case 2 shown in FIG. 3(A)

FIGS. 3(A), 3(B), and 3(C) are respectively a plan view, a bottom view, and a front view of the upper case 2, and FIG. 3(D) is a B-B cross-section view of the upper case shown in FIG. 3(A).

Figure 5:
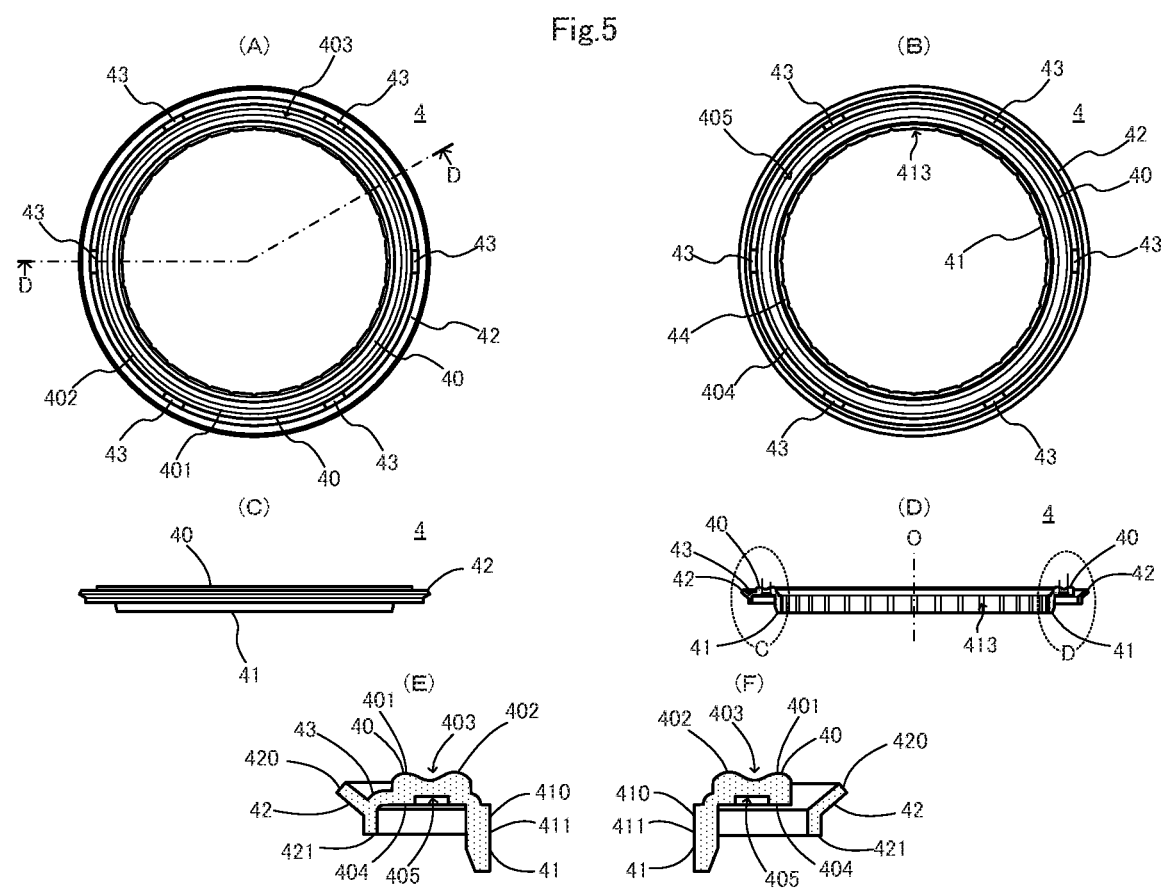
FIGS. 5(A), 5(B), and 5(C) are respectively a plan view, a bottom view, a front view of a dust-seal-integrated center plate 4.
FIG. 5(D) is a D-D cross-section view of the dust-seal-integrated center plate 4 shown in FIG. 5(A)
FIG. 5(E) is an enlarged view of the part C of the dust-seal-integrated center plate 4 shown in FIG. 5(D)
FIG. 5(F) is an enlarged view of the part D of the dust-seal-integrated center plate 4 shown in FIG. 5(D)

As shown in the figures, the upper case 2 comprises: a ring-shaped upper case body 21 having an insertion hole 20 for inserting the strut assembly; an attaching surface 23 which is formed in the upper surface 22 of the upper case body 21 for attaching to the upper support; a ring-shaped groove 25 which is formed in the lower surface 24 of the upper case body 21 facing the lower case 3, to form a ring-shaped space 5 when the upper case 2 is rotatably combined with the lower case 3; a ring-shaped support object surface 27 which is formed in the groove bottom 26 of the ring-shaped groove 25 and rotates relative to a thrust bearing surface 402 (See FIG. 5) of the below-mentioned thrust bearing part 40 of the dust-seal-integrated center plate 4; and a snap fit part 29 for fitting the upper case 2 to the lower case 3.

Figure 4:
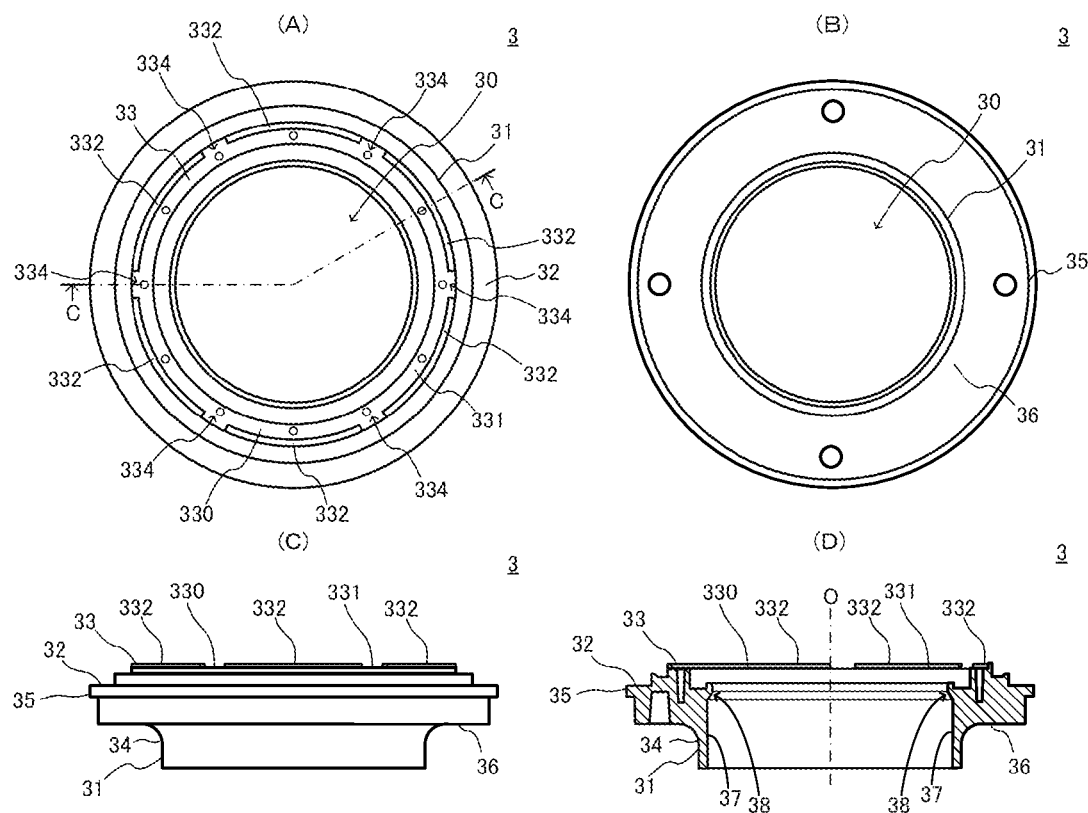
FIGS. 4(A), 4(B), and 4(C) are respectively a plan view, a bottom view, and a front view of a lower case 3.
FIG. 4(D) is a C-C cross-section view of the lower case 3 shown in FIG. 4(A)

The snap fit part 29 has a cylindrical shape extending toward the lower case 3 along the direction of the axis on the inner side (inner diameter side) from the below-mentioned inner peripheral surface 37 (See FIG. 4) of the lower case 3. The end portion 291 of the snap fit part 29 protrudes outward in the radial direction, to engage with an engaging portion 38 (See FIG. 4) of the lower case 3. The end portion 291 of the snap fit part 29 protrudes outermost toward the lower case 3, on the side of the lower surface 24 of the upper case 2.

On the groove bottom 26 of the ring-shaped groove 25, a ring-shaped protective wall 28 is formed on the outer peripheral side of the support object surface 27, to protrude in the direction of the lower surface 24 from the groove bottom 26. This protective wall 28 encloses the outer peripheral side of the thrust bearing part 40 of the dust-seal-integrated center plate 4 placed in the ring-shaped space 5. And when the load is applied to the strut type suspension, the protective wall 28 prevents the lubricating grease filled in the ring-shaped space 5 from being pushed outward in the radial direction from the thrust bearing surface 402 of the thrust bearing part 40 of the dust-seal-integrated center plate 4.

The lower case 3 is a resin body molded of thermoplastic resin such as polyamide. And the lower case 3 is fixed to an upper spring seat 500 as a spring seat for the upper end 501 of a coil spring 502 of the strut type suspension in a state that the strut assembly of the strut type suspension is inserted in the lower case 3.

FIGS. 4(A), 4(B), and 4(C) are respectively a plan view, a bottom view, and a front view of the lower case 3, and FIG. 4(D) is a C-C cross-section view of the lower case 3 shown in FIG. 4(A).

As shown in the figures, the lower case 3 comprises: a ring-shaped lower case body 31 having an insertion hole for inserting the strut assembly; a ring-shaped projection 33 which is formed on the upper surface 32 of the lower case body 31 facing the upper case 2, and is inserted into the ring-shaped groove 25 formed in the lower surface 24 of the upper case body 21 of the upper case 2 to form the ring-shaped space 5, when the lower case 3 is rotatably combined with the upper case 2; and a ring-shaped mud guard 35 which protrudes outward in the radial direction from the outer peripheral surface 34 of the lower case body 31.

In the upper surface 330 of the ring-shaped projection 33, amounting surface 331 is formed for mounting the thrust bearing part 40 of the dust-seal-integrated center plate 4. Further, on the outer peripheral side of the mounting surface 331, a plurality of arc-shaped rotation locks 332 are formed at regular intervals in the circumferential direction. In the circumferential direction, the rotation locks 332 engage with the below-mentioned connecting parts 43 (See FIG. 5) of the dust-seal-integrated center plate 4, to prevent rotation of the dust-seal-integrated center plate 4. And the rotation locks 332 abut against the outer peripheral side of the thrust bearing part 40 of the dust-seal-integrated center plate 4, to prevent deformation in the radially outward direction of the thrust bearing part 40.

In the present embodiment, six rotation locks 332 are provided. However, it is sufficient to provide the rotation locks 332 equal in number to the connecting parts 43 of the dust-seal-integrated center plate 4. In that case, it is favorable that the arc lengths of the rotation locks 332 are adjusted so that gaps 334 in which the connecting parts 43 are placed become equal in width.

On the side of the upper surface 32 of the lower case body 31, the mud guard 35 protrudes from the outer peripheral surface 34 of the lower case body 31 outward in the radial direction beyond the outer peripheral surface 250 of the ring-shaped groove 25 of the upper case 2. The upper spring seal is fixed to the lower surface 36 of the mud guard 35.

In the inner peripheral surface 37 of the lower case 3, the engaging portion 38 is formed so as to engage with the end portion 291 of the snap fit part 29 of the upper case 2.

The dust-seal-integrated center plate 4 is formed of elastic material superior in sliding characteristics such as polyolefin-based thermoplastic elastomer, polyester-based thermoplastic elastomer, polyurethane-based thermoplastic elastomer, polyamide-based thermoplastic elastomer, or the like, and is added with lubricant such as polytetrafluoroethylene (PTFE), lubricating oil, silicone, or the like as needed. In cooperation with the lubricating sheet 6, the dust-seal-integrated center plate 4 supports the load of the vehicle body which is applied to the strut type suspension and transmitted to the upper case 2, while allowing free rotation between the upper case 2 and the lower case 3. Further, the dust-seal-integrated center plate 4 closes the gap leading to the outside of the ring-shaped space 5, to prevent intrusion of foreign matters such as dust into the ring-shaped space 5.

FIGS. 5(A), 5(B), and 5(C) are respectively a plan view, a bottom view, and a front view of the dust-seal-integrated center plate 4, FIG. 5(D) is a D-D cross-section view of the dust-seal-integrated center plater 4 shown in FIG. 5(A), FIG. 5(E) is an enlarged view of the part C of the dust-seal-integrated center plate 4 shown in FIG. 5(D), and FIG. 5(F) is an enlarged view of the part D of the dust-seal-integrated center plate 4 shown in FIG. 5(D).

As shown in the figures, the dust-seal-integrated center plate 4 comprises: a ring-shaped thrust be a ring part 40; a cylindrical radial bearing part 41 which is formed integrally with the thrust bearing part 40, to protrude downward in the axial direction from the inner peripheral edge of the thrust bearing part 40; a cylindrical outer dust seal part 42 which is positioned on the outer peripheral side of the thrust bearing part 40; and the connecting parts 43 which connect the thrust bearing part 40 and the outer dust seal part 42.

The thrust bearing part 40 comprises: a thrust bearing surface 402 formed in the upper surface 401; and a ring-shaped grease groove 403 which is formed in the thrust bearing surface 402 and functions as a grease reservoir. When the dust-seal-integrated center plate 4 is placed on the lower case 3 such that the lower surface 404 of the thrust bearing part 40 comes in contact with the mounting surface 331 of the ring-shaped projection 33 of the lower case 3, the thrust bearing surface 402 faces the support object surface 27 formed in the ring-shaped groove 25 of the upper case 2 via the lubricating sheet 6, and rotates relative to the support object surface 27. Further, in the lower surface 404 on the opposite side to the upper surface 401 in which the thrust bearing surface 402 is formed, a ring-shaped recess 405 is formed at the position opposite to the grease groove 403.

The radial bearing part 41 comprises: a radial bearing surface 411 formed in the inner peripheral surface 410; and grease grooves 413 in the direction of the axis O which are formed in the radial bearing surface 411 and function as grease reservoirs. When the dust-seal-integrated center plate 4 is placed on the lower case 3 such that the lower surface 404 of the thrust bearing part 40 comes in contact with the mounting surface 331 of the ring-shaped projection 33 of the lower case 3, the radial bearing part 41 is inserted into the inside of the ring-shaped projection 33 so that the radial bearing surface 411 slides on the inner peripheral surface 251 of the ring-shaped groove 25 of the upper case 2.

As for the outer dust seal part 42, one end 420 in the axial direction abuts against the protective wall 28 formed to protrude downward from the groove bottom 26 of the ring-shaped groove 25 of the upper case 2, and the other end 421 in the axial direction abuts against the upper surface 330 of the ring-shaped projection 33 of the lower case 3. As a result, the gap leading to the outside of the ring-shaped space 5 is closed, to prevent intrusion of foreign matters such as dust into the ring-shaped space 5.

Further, the outer dust seal part 42 is formed to be thinner than the thrust bearing part 40 and the radial bearing part 41, and the one end 420 which abuts against the upper case 2 is inclined outward in the radial di seen in the axial cross-section. Accordingly, the one end 420 of the outer dust seal part 42 comes in contact with the protective wall 28 of the ring-shaped groove 25 of the upper case 2, while being deflected (See FIG. 2). The reaction force of the outer dust seal part 42 acting against the load of the vehicle body applied to the strut type suspension gives sufficient sealing performance to close the gap leading to the outside of the ring-shaped space 5.

The connecting parts 43 extend outward in the radial direction from the outer peripheral side of the thrust bearing part 40, to connect with the outer dust seal part 42. Further, the connecting parts 43 have narrower width in the circumferential direction than the gaps 334 between the rotation locks 332 themselves formed on the mounting surface 331 of the ring-shaped projection 33 of the lower case body 31 of the lower case 3. And the connecting parts 43 are positioned in the respective gaps 334, to place the thrust bearing part 40 on the mounting surface 331. By engagement of the connecting parts 43 with the respective rotation locks 332 in the circumferential direction, the dust-seal-integrated center plate 4 is prevented from rotating. Although six connecting parts 43 are provided in the present embodiment, it is sufficient to provide at least one connecting part 43.

The lubricating sheet 6 is formed of thermoplastic material superior in sliding characteristics such as fluorine resin (such as PTFE, modified PTFE obtained by copolymerizing tetrafluoroethylene (TFE) with a small amount of another material (comonomer), or the like), polyacetal resin, polyethylene resin, polyamide resin, polyphenylene sulfide resin, or the like, and, as needed, is added with lubricant such as PTFE (excepting the case where the thermoplastic material is PTFE or modified PTFE), lubricant such as lubricating oil, silicone, or graphite, and/or reinforcing material such as aramid fiber, glass fiber, carbon fiber, or the like. Or, the lubricating sheet 6 is formed of metal superior in sliding characteristics such as brass alloy. The lubricating sheet 6 is a ring-shaped member, and is placed between the support object surface 27 formed in the groove bottom 26 of the ring-shaped groove 25 of the upper case 2 and the thrust bearing surface 402 of the thrust bearing part 40 of the dust-seal-integrated center plate 4. Owing to this arrangement, the thrust bearing surface 402 can rotate relative to the support object surface 27 via the lubricating sheet 6.

Figure 6:
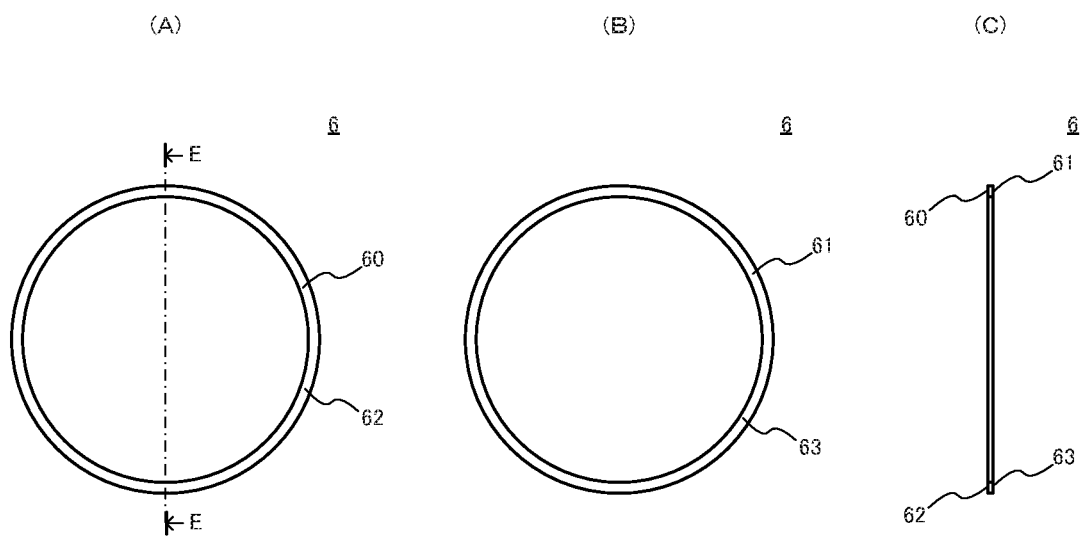
FIGS. 6(A) and 6(B) are respectively a plan view and a bottom view of a lubricating sheet 6.
FIG. 6(C) is an E-E cross-section view of the lubricating seat 6 shown in FIG. 6(A)

FIGS. 6(A) and 6(B) are respectively a plan view and a bottom view of the lubricating sheet 6, and FIG. 6(C) is an E-E cross-section view of the lubricating sheet 6 shown in FIG. 6(A).

As shown in the figures, the lubricating sheet 6 comprises: a sliding surface 62 which is formed in the upper surface 60, to slide on the support object surface 27 formed in the groove bottom 26 of the ring-shaped groove 25 of the upper case 2; and a sliding surface 63 which is formed in the lower surface 61, to slide on the thrust bearing surface 402 of the thrust bearing part 40 of the dust-seal-integrated center plate 4. The thickness of the lubricating sheet 6 depends on the material used, and, for example, 0.1 mm-1 mm, and favorably 0.2 mm-0.7 mm. Further, it is favorable that the lubricating sheet 6 is flat in both the front and back surfaces.

In the slide bearing 1 of the above-described configuration of the present embodiment, the thrust bearing part 40 of the dust-seal-integrated center plate 4 is mounted on the mounting surface 331 of the ring-shaped projection 33 of the lower case 33, in a state that the dust-seal-integrated center plate 4 is prevented from rotating owing to engagement of the connecting parts 43 in the circumferential direction with the rotation locks 332 formed on the mounting surface 331. And the thrust bearing surface 402 of the thrust bearing part 40 rotates relative to the support object surface 27 of the ring-shaped groove 25 of the upper case 2 via the lubricating sheet 6. Further, the radial bearing part 41 is inserted into the inside of the ring-shaped projection 33, and the radial bearing surface 411 of the radial bearing part 41 slides on the inner peripheral surface 251 of the ring-shaped groove 25 of the upper case 2. Accordingly, the dust-seal-integrated center plate 4 is supported by the upper spring seat fixed to the lower surface 36 of the mud guard 35 of the lower case 3 and by the coil spring of the strut type suspension, and thus supports the load of the vehicle body applied to the strut type suspension which is transmitted to the upper case 4, while allowing rotation between the upper case 2 and the lower case 3.

Hereinabove, one embodiment of the present invention has been described.

In the present embodiment, the dust-seal-integrated center plate 4 is placed in the ring-shaped space 5 formed by combining the upper case 2 with the lower case 3 such that the one end 420 in the axial direction of the outer dust seal part 42 abuts against the protective wall 28 in the ring-shaped groove 25 of the upper case 2 and the other end 421 in the axial direction abuts against the upper surface 330 of the ring-shaped projection 33 of the lower case 3. Owing to this arrangement, the reaction force of the outer dust seal part 42 acting against the load of the vehicle body applied to the strut type suspension gives sufficient sealing performance to close the gap leading to the outside of the ring-shaped space 5, without embedding a metal core in the outer dust seal part 42 to increase the rigidity.

Further, in the present embodiment, the outer dust seal part 42 is connected to the thrust bearing part 40 via the connecting parts 43 extending outward in the radial direction from the outer peripheral side of the thrust bearing part 40, and the outer dust seal part 42 is formed integrally with the thrust bearing part 40. Accordingly, it is not necessary to provide the outer dust seal part 42 as a separate part, and, as a result, cost can be reduced.

Further, in the present embodiment, the lubricating sheet 6 is placed between the thrust bearing surface 402 of the thrust bearing part 40 and the support object surface 27 of the ring-shaped groove 25 of the upper case 2. Accordingly, even if elastomer is used as the material of the dust-seal-integrated center plate 4 to give elasticity to the outer dust seal part 42, it is possible to realize superior sliding performance.

Thus, according to the present embodiment, it is possible to prevent intrusion of dust, muddy water, or the like at lower cost and to realize superior sliding performance.

Further, in the present embodiment, the dust-seal-integrated center plate 4 is provided with the cylindrical radial bearing part 41 formed integrally with the thrust bearing part 40, to protrude downward in the axial direction from the inner peripheral edge of the thrust bearing part 40, so that the radial bearing surface 411 slides on the inner peripheral surface 251 of the ring-shaped groove 25 of the upper case 2. Thus, according to the present embodiment, it is possible to support the load in the radial direction in addition to the load of the vehicle body in the thrust direction, while allowing rotation between the upper case 2 and the lower case 3.

Further, in the present embodiment, the ring-shaped grease groove 403 functioning as a grease reservoir is formed in the thrust bearing surface 402 of the thrust bearing part 40. Accordingly, it is possible to hold more lubricating grease on the thrust bearing surface 402. As a result, according to the present invention, the thrust bearing surface 402 is cove red with lubricating grease film, and it is possible to support over a longer period of time the load of the vehicle body applied to the strut type suspension, while allowing smooth rotation of the strut assembly of the strut type suspension.

Further, in the present embodiment, in the lower surface 404 on the opposite side to the upper surface 401 in which the thrust bearing surface 402 is formed, the ring-shaped recess 405 is formed at the position opposite to the grease groove 403 of the thrust bearing surface. Accordingly, it is possible to prevent that force applied from the mounting surface 331 of the ring-shaped projection 33 of the lower case 3 to the thrust bearing part 40 raises the groove bottom of the grease groove 403 of the thrust bearing surface 402 toward the upper case 2. As a result, according to the present embodiment, it is possible to prevent the grease in the grease groove 403 from overflowing from the grease groove 403, and thereby to keep the grease in the grease groove 403 and to maintain the sliding performance for a longer period.

Further, in the present embodiment, the arc-shaped rotation locks 332 are formed on the outer peripheral side of the mounting surface 331 formed in the upper surface 330 of the ring-shaped projection 33 of the lower case 3. These rotation locks 332 engages in the circumferential direction with the respective connecting parts 43 of the dust-seal-integrated center plate 4, to prevent rotation of the dust-seal-integrated center plate 4. And at the same time, the rotation locks 332 abut against the outer peripheral side of the thrust bearing part 40 of the dust-seal-integrated center plate 4, to prevent deformation of the thrust bearing part 40 outward in the radial direction owing to the load of the vehicle body applied to the strut type suspension. Thus, according to the present embodiment, it is possible to prevent shift of the located position of the outer dust seal part 42 owing to deformation of the thrust bearing part 40 outward in the radial direction and to prevent decrease of the sealing performance of the outer dust seal part 42.

Further, in the present embodiment, the lower case 3 is provided with the ring-shaped mud guard 35, which protrudes from the outer peripheral surface 34 of the lower case body 31 on the side of the upper surface 32 of the lower case body 31 and outward in the radial direction beyond the outer peripheral surface 250 of the ring-shaped groove 25 of the upper case 2. Accordingly, the mud guard 35 can prevent muddy water or the like which jumps into the vehicle body from road surface while the vehicle is moving, so as to prevent more efficiently intrusion of the muddy water or the like into the ring-shaped space 5 of the slide bearing 1.

Further, in the present embodiment, the snap fit part 29 which has the cylindrical shape extending toward the lower case 3 along the direction of the axis O and whose end portion 291 engages with the engaging portion 38 of the lower case 3 is formed on the inner peripheral side of the upper case 2 (on the inner side from the inner peripheral surface 37 of the lower case 3). Here, the end portion 291 of the snap fit part 29 protrudes outward in the radial direction and protrudes outermost toward the lower case 3 on the side of the lower surface 24 of the upper case 2. As a result, according to the present embodiment, it is possible to simplify the structure of the mold required for resin molding of the upper case 2, in comparison with the case where a snap fit part is provided on the outer peripheral side of the upper case 2 and the end portion of the snap fit part is made to protrude inward in the radial direction. In detail, in the case where a snap fit part is provided on the outer peripheral side of the upper case 2 such that the end portion of the snap fit part protrudes inward in the radial direction, it is necessary to divide a mold into plural parts and is necessary to use slides to form the end portion of the snap fit part that protrudes inward in the radial direction. In contrast to this, in the present embodiment, a slide is not required and the mold structure can be simplified, since the end portion 291 of the snap fit part 29 is made to protrude outermost toward the lower case 3 on the side of the lower surface 24 of the upper case 2 and is made to protrude outward in the radial direction.

Further, in the present embodiment, the ring-shaped protective wall 28 is provided in the groove bottom 26 of the ring-shaped groove 25 of the upper case, to enclose the outer peripheral side of the thrust bearing part 40 of the dust-seal-integrated center plate 4 placed in the ring-shaped space 5 formed by combining the upper case 2 with the lower case 3. Owing to this protective wall 28, it is possible to prevent the lubricating grease filled in the ring-shaped space 5 from being pushed outward in the radial direction from the thrust bearing surface 402 of the thrust bearing part 40, when the load is applied to the strut type suspension. Accordingly, the thrust bearing surface 402 can be covered with the lubricating grease more reliably. Thus, according to the present embodiment, it is possible to support over a longer period of time the load of the vehicle body applied to the strut type suspension while allowing smooth rotation of the strut assembly of the strut type suspension.

The present invention is not limited to the above-described embodiment, and can be varied variously within the scope of the invention.

For example, in the above embodiment, the dust-seal-integrated center plate 4 is placed in the ring-shaped space 5 which is formed by combining the upper case 2 with the lower case 3, such that the one end 420 in the axial direction of the outer dust seal part 42 abuts against the protective wall 28 in the ring-shaped groove 25 of the upper case 2 and the other end 421 in the axial direction abuts against the upper surface 330 of the ring-shaped projection 33 of the lower case 3. However, the present invention is not limited to this. It is sufficient that the dust-seal-integrated center plate 4 is placed in the ring-shaped space 5 such that the one end 420 in the axial direction of the outer dust seal part 42 is abutted against the protective wall 28 in the ring-shaped groove 25 of the upper case 2. In this case also, since the thrust bearing part 40 formed integrally with the outer dust seal part 42 is fixed on the mounting surface 331 of the ring-shaped projection 33 of the lower case 3, sufficient sealing performance to close the gap leading to the outside of the ring-shaped space 5 can be obtained by reaction force generated by deflection of the outer dust seal part 42. In this case, the other end 421 in the axial direction can be omitted.

Further, the above embodiment have been described taking the example in which one lubricating sheet 6 is placed between the support object surface 27 formed in the groove bottom 26 of the ring-shaped groove 25 of the upper case 2 and the thrust bearing surface 402 of the thrust bearing part 40 of the dust-seal-integrated center plate 4. The present invention, however, is not limited to this.

Figure 7:
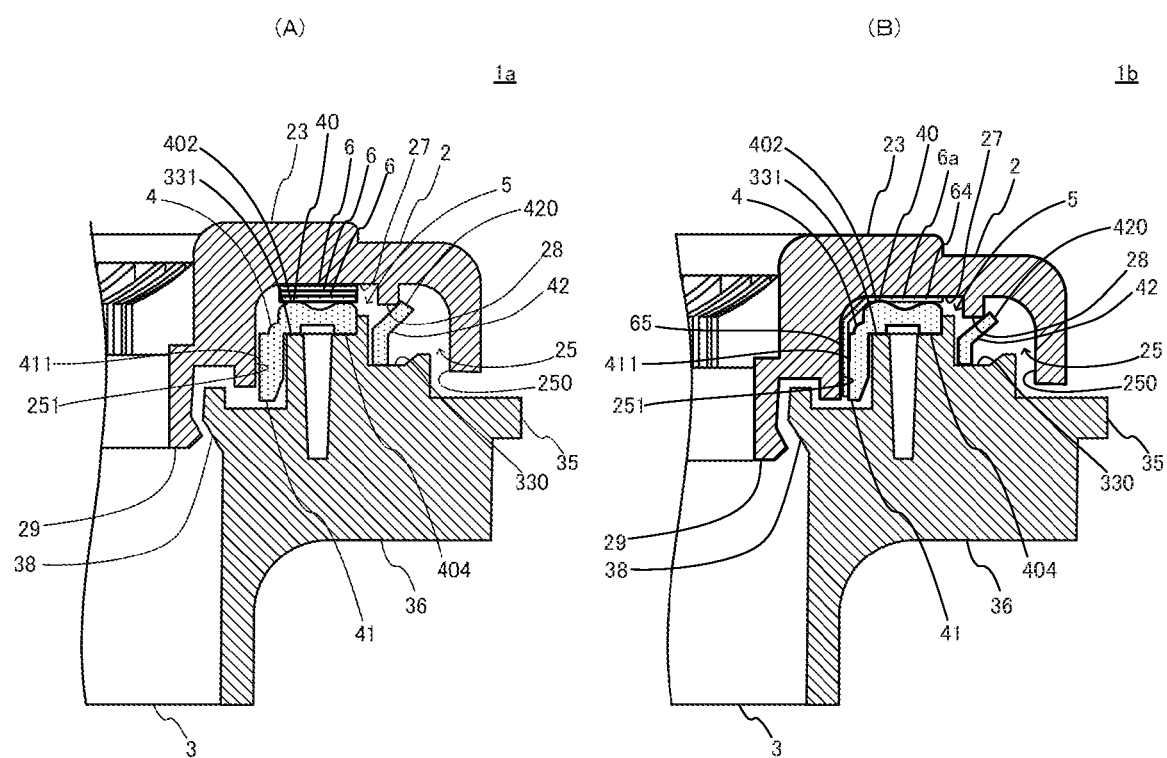
FIGS. 7(A) and 7(B) are views for explaining variations 1a and 1b of the slide bearing 1, and correspond to FIG. 2(B)

For example, as seen in the variation 1a of the slide bearing 1 shown in FIG. 7(A), a plurality of lubricating sheets 6 may be placed to overlap each other between the support object surface 27 and the thrust bearing surface 402. When a plurality of lubricating sheets 6 are laid to overlap each other and slide on each other, it is possible to shorten slide lengths between the lubricating sheet 6 themselves, between the support object surface 27 and the lubricating sheet 6, and between the thrust bearing surface 402 and the lubricating sheet 6, and this decreases abrasion at each sliding location and extends lifetime.

Here, it is possible to provide a recess 200 in the support object surface 27 of the ring-shaped groove 25 of the upper case 2 for receiving lubricating sheet 6, so that at least one lubricating sheet 6 is placed in this recess. The depth of this recess 200 is set to the thickness of lubricating sheet 6 or more, for example.

Further, just as, in the above embodiment, the lubricating sheet 6 is placed between the thrust bearing surface 402 of the thrust bearing part 40 and the support object surface 27 of the ring-shaped groove 25 of the upper case 2, a lubricating sheet may be placed also between the radial bearing surface 411 of the radial bearing part 41 and the inner peripheral surface 251 of the ring-shaped groove 25 of the upper case 2.

For example, as seen in the variation 1b of the slide bearing 1 shown in FIG. 7(B), it is possible to use a lubricating sheet 6a which is formed such that a ring-shaped thrust sheet part 64 is integrated with a radial sheet part 65. The thrust sheet part 64 is positioned between the thrust bearing surface 402 of the thrust bearing part 40 and the support object surface 27 of the ring-shaped groove 25 of the upper case 2. The radial sheet part 65 is formed integrally with the inner peripheral edge of the thrust sheet part 64 and is positioned between the radial bearing surface 411 of the radial bearing part 41 and the inner peripheral surface 251 of the ring-shaped groove 25 of the upper case 2. This arrangement can realize more superior sliding performance.

Further, in the above embodiment, the rotation locks 332 are formed on the outer peripheral side of the mounting surface 331 formed in the upper surface 330 of the ring-shaped projection 33 of the lower case 3. The present invention, however, is not limited to this. It is possible to form rotation locks on the outer peripheral side of the support object surface 27 formed in the groove bottom 26 of the ring-shaped groove 25 of the upper case 2, and to make these rotation locks to engage with the connecting parts 43 of the dust-seal-integrated center plate 4, so as to prevent rotation of the dust-seal-integrated center plate 4. At the same time, these rotation locks may be abuts against the outer peripheral side of the thrust bearing part 40 of the dust-seal-integrated center plate 4, to prevent deformation of the thrust bearing part 40 outward in the radial direction owing to the load of the vehicle body applied to the strut type suspension. In this case, a thrust bearing surface is formed in the lower surface 404 of the thrust bearing part 40, and this thrust bearing surface is made to come in slidable contact with the mounting surface 331 of the ring-shaped projection 33 of the lower case 3.

Figure 10:
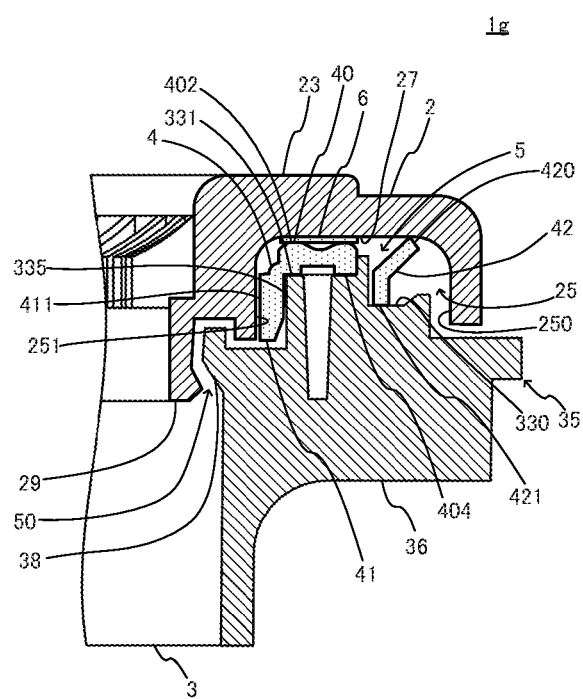
FIG. 10 is a view for explaining a variation 1g of the slide bearing 1, and corresponds to FIG. 2(B).
Figure 11:
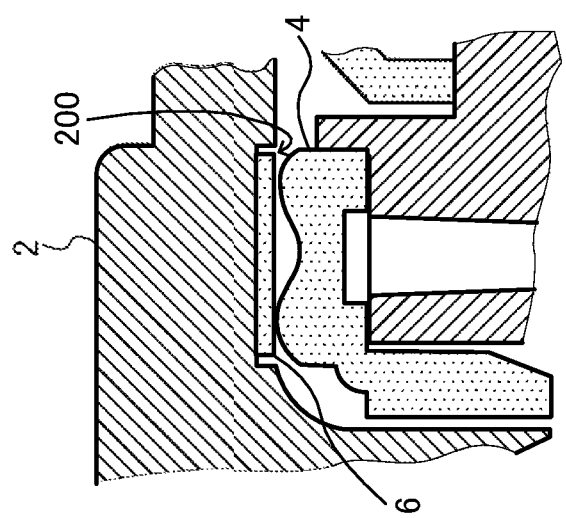
FIG. 11 and FIG. 12 are views showing a lower case that is fixed to an upper spring seat as a spring seat for the upper end of a coil spring of the strut type suspension in a state that the strut assembly of the strut type suspension is inserted in the lower case 3; showing an upper case mounted on an upper support; and showing a recess in the support object surface of the ring-shaped groove of the upper case.
Figure 12:
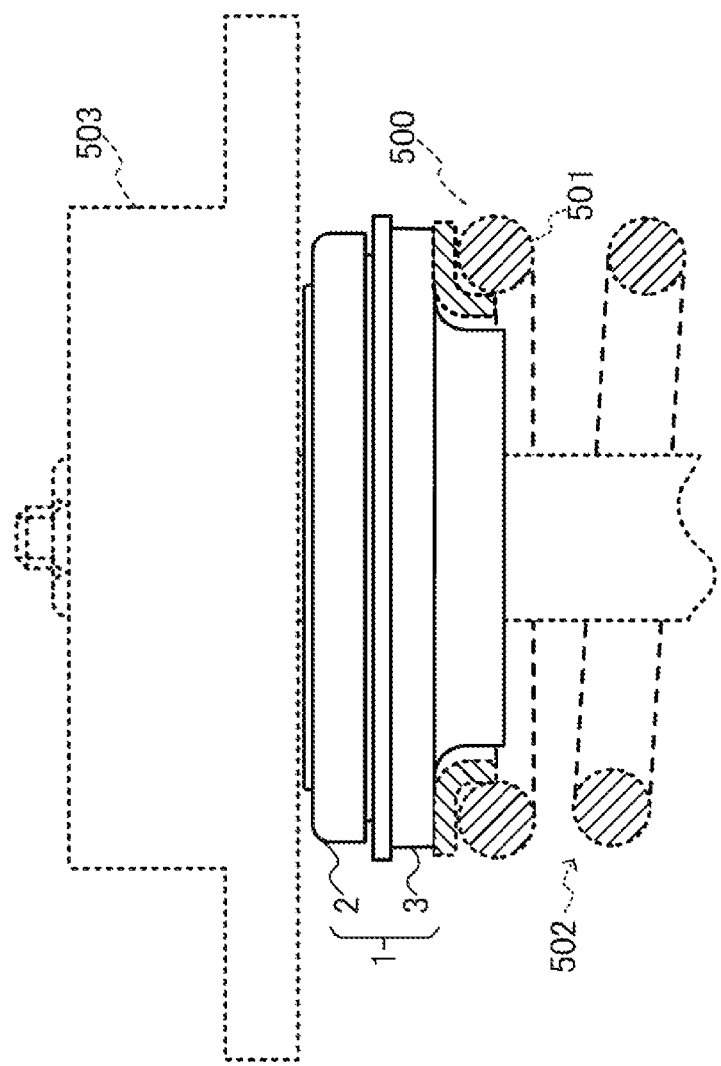

Further, in the above embodiment, the one end 420 in the axial direction of the outer dust seal part 42 of the dust-seal-integrated center plate 4 is made to abut against the protective wall 28 which is formed to protrude downward from the groove bottom 26 of the ring-shaped groove 25 of the upper case 2, in order to abut against the groove bottom 26 of the ring-shaped groove 25. The present invention, however, is not limited to this. For example, as seen in the variation 1g of the slide bearing 1 shown in FIG. 10, the one end 420 of the outer dust seal part 42 may be directly abutted against the groove bottom 26 of the ring-shaped groove 25.

Figure 2:
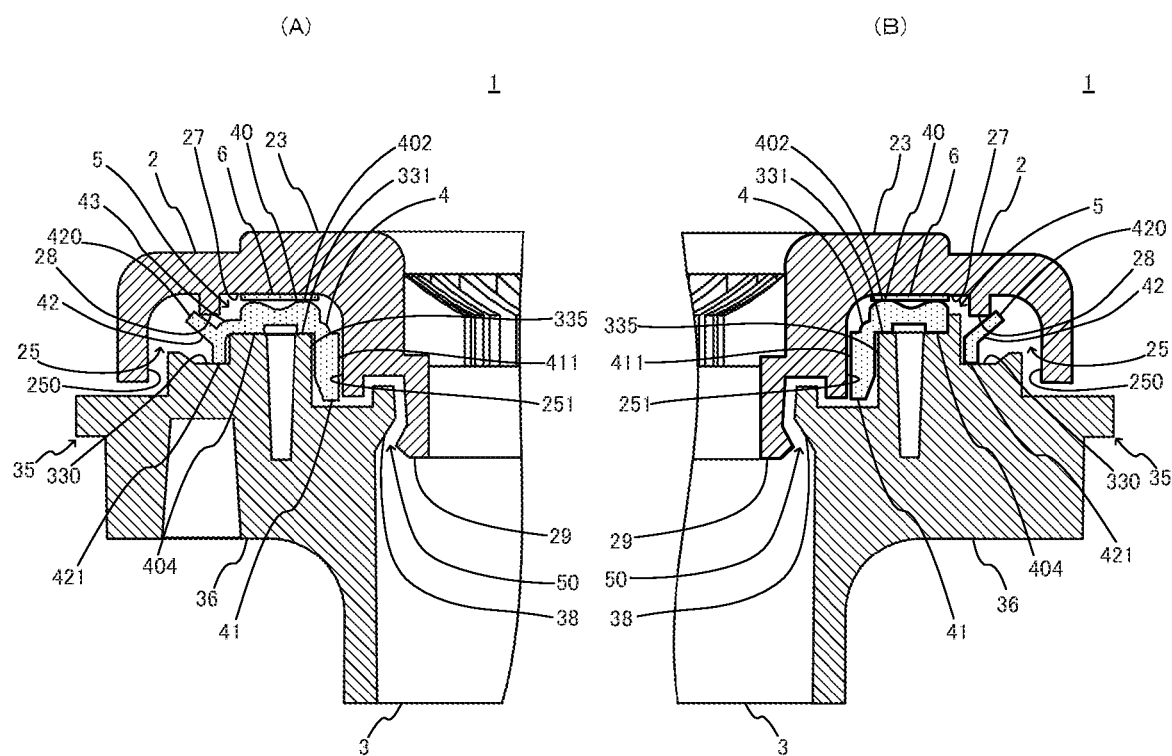
FIG. 2(A) is an enlarged view of the part A of the slide bearing shown in FIG. 1(D)
FIG. 2(B) is an enlarged view of the part B of the slide bearing shown in FIG. 1(D)

Further, in the above embodiment, the one end 420 of the outer dust seal part 42 which abuts on the side of the groove bottom 26 of the ring-shaped groove 25 of the upper case 2 is inclined outward in the radial direction seen in the axial cross-section of the dust-seal-integrated center plate 4 (See FIG. 2). The present invention, however, is not limited to this. It is sufficient that, seen in the axial cross-section, at least one of both the ends 420 and 421 of the outer dust seal part 42 is inclined outward or inward in the axial direction.

Figure 8:
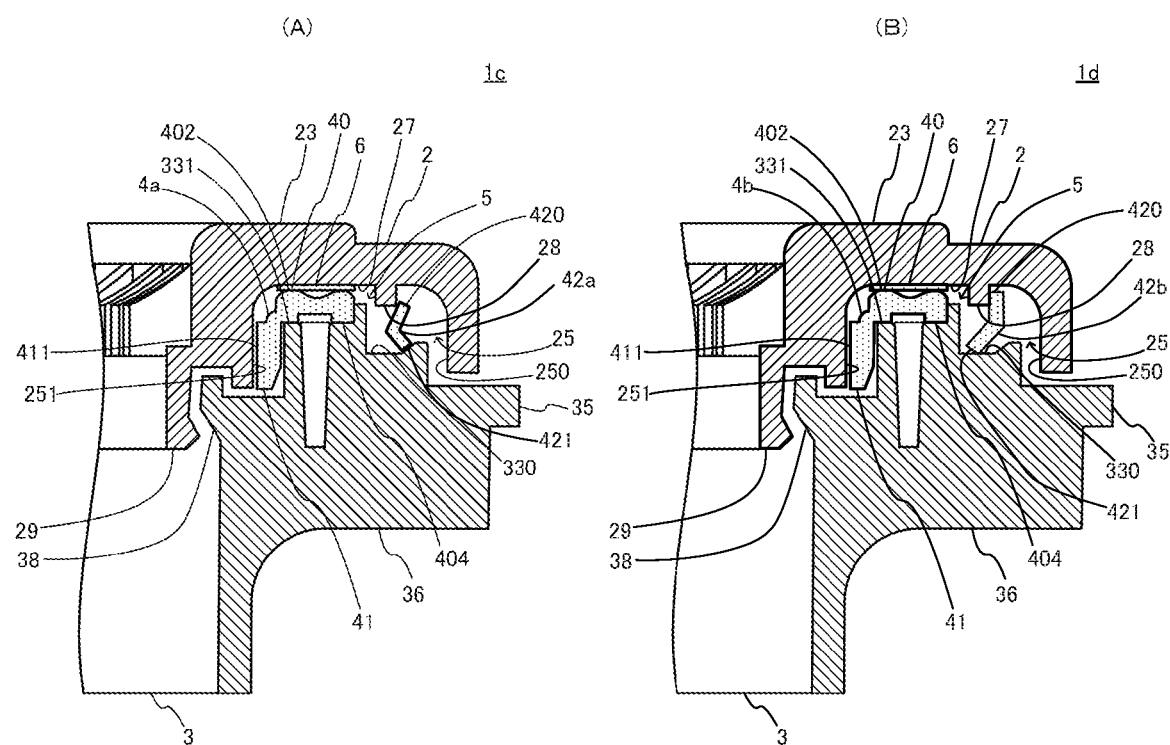
FIGS. 8(A) and 8(B) are views for explaining variations 1c and 1d of the slide bearing 1, and correspond to FIG. 2(B)

For example, as seen in the variation 1c of the slide bearing 1 shown in FIG. 8(A), it is possible to use a dust-seal-integrated center plate 4a having an outer dust seal part 42a whose both ends are inclined outward in the radial direction seen in the axial cross-section. Or, as seen in the variation 1d of the slide bearing 1 shown in FIG. 8(B), it is possible to use a dust-seal-integrated center plate 4b having an outer dust seal part 42b whose end 421 abuts on the side of the upper surface 330 of the ring-shaped projection 33 of the lower case 3 is inclined inward in the radial direction seen in the axial cross-section.

Figure 9:
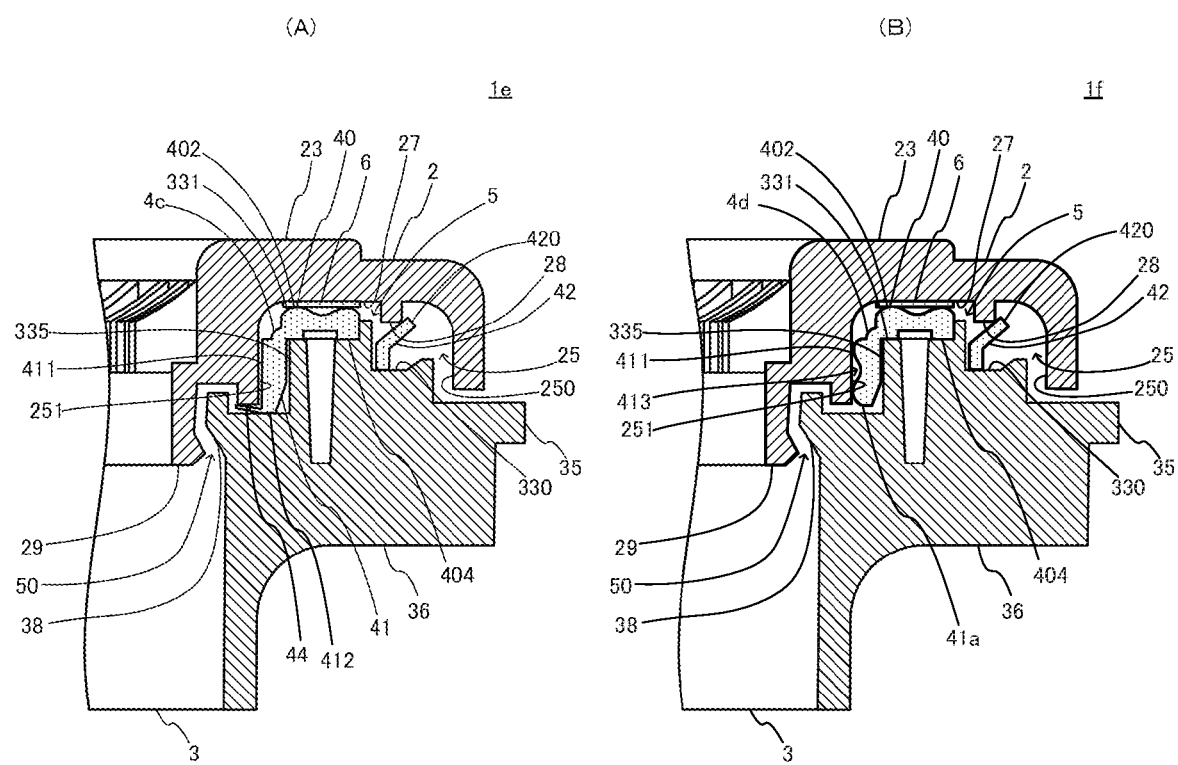
FIGS. 9(A) and 9(B) are views for explaining variations 1e and 1f of the slide bearing 1, and correspond to FIG. 2(B)

Further, if there is a possibility that dust, muddy water, or the like intrudes into the ring-shaped space 5 through the gap 50 (See FIG. 2) between the inner peripheral surface 251 of the ring-shaped groove 25 of the upper case 2 and the inner peripheral surface 335 of the ring-shaped projection 33 of the lower case 251, a dust seal may be added to close this gap 50. For example, as seen in the variation 1e of the slide bearing 1 shown in FIG. 9(A), it is possible to use a dust-seal-integrated center plate 4c with which an inner dust seal part 44 to close the gap 50 leading to the ring-shaped space 5 is formed integrally at the end 412 of the radial bearing part 41 on the side of the lower case 3.

Further, in the above embodiment, as in the thrust bearing surface 402 of the thrust bearing part 40, a grease groove functioning as a grease reservoir may be formed also in the radial bearing surface 411 of the radial bearing part 41. For example, as seen in the variation 1f of the slide bearing 1 shown in FIG. 9(B), it is possible to use a dust-seal-integrated center plate 4d having a radial bearing part 41a whose radial bearing surface 411 has a ring-shaped grease groove 413 functioning as a grease reservoir formed therein.

Further, in the above embodiment, the dust-seal-integrated center plate 4 is placed and fixed on the lower case 3. However, the dust-seal-integrated center plate 4 may be placed rotatably on the lower case 3. In other words, similarly to the upper surface 401 of the thrust bearing part 40, a thrust bearing surface may be formed also in the lower surface 404 of the thrust bearing part 40, so that this thrust bearing surface comes in slidable contact with the mounting surface 331 of the ring-shaped projection 33 of the lower case 3. In this case, the rotation locks 332 positioned on the outer peripheral side of the mounting surface 331 of the ring-shaped projection 33 are omitted. Further, the recess 405 is not needed in the lower surface 404 of the thrust bearing part 40. Here, to hold more lubricating grease in the thrust bearing surface formed in the lower surface 404 of the thrust bearing part 40, a grease groove may be formed also in this thrust bearing surface. Further, at least one lubricating sheet 6 may be placed also between the thrust bearing surface formed in the lower surface 404 of the thrust bearing part 40 and the mounting surface 331 of the ring-shaped projection 33 of the lower case 3. Further, it is favorable that both the ends 420 and 421 of the outer dust seal part 42 of the dust-seal-integrated center plate 4 are inclined, so that both the ends 420 and 421 are respectively abutted against the groove bottom 26 of the ring-shaped groove 25 of the upper case 2 and the upper surface 330 of the ring-shaped projection 33 of the lower case 3.

Further, in the above embodiment, the dust-seal-integrated center plate 4 may be formed integrally with the lower case 3. In this case, it is not necessary to form the arc-shaped rotational locks 332 on the outer peripheral side of the mounting surface 331 of the lower case 3. Further, in the ring-shaped space 5 formed by combining the upper case 2 with the lower case 3, the dust-seal-integrated center plate 4 formed integrally with the lower case 3 is positioned in the ring-shaped space 5 such that the one end 420 in the axial direction of the outer dust seal part 42 abuts against the groove bottom 26 including the protective wall 28 in the ring-shaped groove 25 of the upper case 2.

Or, in the above embodiment, the dust-seal-integrated center plate 4 may be formed integrally with the upper case 2. In this case also, it is not necessary to form the arc-shaped rotation locks 332 on the outer peripheral side of the mounting surface 331 of the lower case 3. Further, the lubricating sheet 6 is placed between the dust-seal-integrated center plate 4 formed integrally with the upper case 2 and the mounting surface 331 of the ring-shaped projection 33 of the lower case 3. Further, in the ring-shaped space 5 formed by combining the upper case 2 with the lower case 3, the dust-seal-integrated center plate 4 formed integrally with the upper case 2 is positioned in the ring-shaped space 5 such that the other end 421 in the axial direction of the outer dust seal part 42 abuts against the upper surface 330 of the ring-shaped projection 33 of the lower case 3.

Further, in the above embodiment, the ring-shaped recess 405 is formed at the position opposite to the grease groove 403 of the thrust bearing surface 402 in the lower surface 404 on the opposite side to the upper surface 401. The present invention, however, is not limited to this. The lower surface 404 of the thrust bearing part 40 may be a flat surface. In this case also, similar effects to those of the above embodiment can be obtained except for the effect owing to the ring-shaped recess 405. Further, instead of providing the ring-shaped recess 405 in the lower surface 404 of the thrust bearing part 40, a ring-shaped recess may be provided in the mounting surface 331 of the ring-shaped projection 33 of the lowercase. In this case, similar effects to those of the above embodiment can be obtained.

Further, the above embodiment have been described taking the example where the slide bearing of the present embodiment is applied to the strut type suspension. The present invention, however, is not limited. Without being limited to the strut type suspension, the slide bearing of the present invention can be widely applied to slide bearings which support load while allowing rotation in various mechanisms including a double wishbone type suspension, a multilink type suspension, an air suspension, or the like.

REFERENCE SIGNS LIST 1, 1*a*-1*g*: slide bearing; 2: upper case; 3: lower case; 4, 4*a*-4*d*: dust-seal-integrated center plate; 5: ring-shaped space; 6, 6*a*: lubricating sheet; 10: receiving hole for the slide bearing 1; 20: insertion hole of the upper case 2; 21: upper case body; 22: upper surface of the upper case body 21; 23: attaching surface of the upper case body 21; 24: lower surface of the upper case body 21; 25: ring-shaped groove of the upper case body 21; 26: groove bottom of the ring-shaped groove 25; 27: support object surface of the upper case body 21; 28: protective wall of the upper case body 21; 29: snap fit part; 30: insertion hole of the lower case 3; 31: lower case body; 32: upper surface of the lower case body 31; 33: ring-shaped projection of the lower case body 31; 34: outer peripheral surface of the lower case body 31; 35: mud guard; 36: lower surface of the mud guard 35; 37: inner peripheral surface of the lower case body 31; 38: engaging portion of the lower case body 31; 40: thrust bearing part; 41: radial bearing part; 42: outer dust seal part; 43: connecting part; 44: inner dust seal part; 50: gap leading to the ring-shaped space 5; 60: upper surface of the lubricating sheet 6; 61: lower surface of the lubricating sheet 6; 63, 64: ring-shaped thrust sheet part of the lubricating sheet 6; 250: outer peripheral surface of the ring-shaped groove 25; 251: inner peripheral surface of the ring-shaped groove 25; 291: end portion of the snap fit part 29; 330: upper surface of the ring-shaped projection 33; 331: mounting surface of the ring-shaped projection; 332: rotation lock of the ring-shaped projection 33; 334: gap between rotation locks 332; 335: inner peripheral surface of the ring-shaped projection 33; 401: upper surface of the thrust bearing part 40; 402: thrust bearing surface; 403: grease groove; 404: lower surface of the thrust bearing part 40; 405: recess of the thrust bearing part 40; 410: inner peripheral surface of the radial bearing part 41; 411: radial bearing surface; 412: end of the radial bearing part 41; 413: grease groove; and 420, 421: end of the outer dust seal part 42.

The invention claimed is:

1. A slide bearing comprising:
an upper case;
a lower case rotatably combined with the upper case;
a ring-shaped center plate placed between the upper case and the lower case and having a connecting part which extends outward in a radial direction from the outer peripheral side of the center plate; and
a ring-shaped outer dust seal positioned on an outer peripheral side of the center plate, the connecting part connecting with the outer dust seal;
a ring-shaped lubricating sheet placed between the center plate and the upper case and/or between the center plate and the lower case, at least one of front and back surfaces of the lubricating sheet having a sliding surface which slides on a counter surface facing the lubricating sheet; and
the upper case having a ring-shaped groove formed in a surface facing the lower case and a recess formed in the ring-shaped groove of the upper case in order to receive the lubricating sheet, one end of the outer dust seal abutting against the upper case inside the ring-shaped groove of the upper case.

2. A slide bearing of claim 1, wherein:
another end of the outer dust seal abuts against the lower case.

3. A slide bearing of claim 1, wherein:
a protective wall is formed in a groove bottom of the ring-shaped groove; and
the one end of the outer dust seal abuts against the protective wall inside the ring-shaped groove of the upper case.

4. A slide bearing of claim 1, wherein:
the lower case further has a ring-shaped mud guard which protrudes outward in a radial direction from an outer peripheral surface of the lower case beyond an outer peripheral surface of the ring-shaped groove of the upper case.

5. A slide bearing of claim 1, wherein said ring-shaped lubricating sheet is one of a plurality of lubricating sheets which are laid to overlap slidably on each other.

6. A slide bearing of claim 1, wherein:
the center plate comprises:
a ring-shaped thrust bearing part which is placed between the upper case and the lower case in a thrust direction; and
a radial bearing part which is formed integrally with an inner peripheral edge of the ring-shaped thrust bearing part and placed between the upper case and the lower case in a radial direction.

7. A slide bearing of claim 6, wherein:
the lubricating sheet comprises:
a ring-shaped thrust sheet which is positioned between the ring-shaped thrust bearing part and the upper case and/or between the thrust bearing part and the lower case; and
a cylindrical radial sheet which is formed integrally with an inner peripheral edge of the ring-shaped thrust sheet and positioned between the radial bearing part and the upper case and/or between the radial bearing part and the lower case.

8. A slide bearing of claim 6, further comprising:
a ring-shaped inner dust seal which is formed integrally with an end of the radial bearing part and abuts against the upper case or the lower case.

9. A slide bearing of claim 6, wherein:
the ring-shaped thrust bearing part of the center plate has a ring-shaped grease groove which is formed in a surface facing the lubricating sheet and functions as a grease reservoir.

10. A slide bearing of claim 9, wherein:
the ring-shaped thrust bearing part of the center plate further has a ring-shaped recess formed in a surface opposed to the surface having the grease groove.

11. A slide bearing of claim 1, wherein:
the center plate is formed integrally with the lower case; and
the lubricating sheet is placed between the center plate and the upper case.

12. A slide bearing of claim 1, wherein:
the center plate is formed integrally with the upper case; and
the lubricating sheet is placed between the center plate and the lower case.

13. A slide bearing of claim 1, wherein:
the lower case is a ring-shaped member having an inner peripheral surface provided with an engaging part;
the upper case has a snap fit part which extends toward the lower case along an axial direction on an inner side from the inner peripheral surface of the lower case, and an end portion of the snap fit part protrudes outward in a radial direction to engage with the engaging part of the inner peripheral surface of the lower case.

14. A slide bearing of claim 1, wherein:
the slide bearing supports a load of a vehicle applied to a strut type suspension while allowing rotation of a strut assembly of the strut type suspension;
the upper case is mounted to a mounting mechanism for mounting the strut assembly on the vehicle body, in a state that the strut assembly is inserted in the upper case; and
the lower case is fixed to a spring seat for an upper end of a coil spring combined with the strut assembly, in a state that the strut assembly is inserted in the lower case.

15. A slide bearing comprising:
an upper case;
a lower case rotatably combined with the upper case;
a ring-shaped center plate placed between the upper case and the lower case, the center plate having a connecting part extending outward in a radial direction from the outer peripheral side of the center plate, a ring-shaped thrust bearing part placed between the upper case and the lower case in a thrust direction, and a radial bearing part formed integrally with an inner peripheral edge of the ring-shaped thrust bearing part and placed between the upper case and the lower case in a radial direction; and
a ring-shaped outer dust seal positioned on an outer peripheral side of the center plate, the connecting part connecting with the outer dust seal, one end of the outer dust seal abutting against the upper case or the lower case;
a ring-shaped lubricating sheet placed between the center plate and the upper case and/or between the center plate and the lower case, at least one of front and back surfaces of the lubricating sheet having a sliding surface which slides on a counter surface facing the lubricating sheet; and
a rotation lock which is formed in a surface of the lower case facing the upper case or in a surface of the upper case facing the lower case, and engages with the connecting part of the ring-shaped thrust bearing part in a circumferential direction so as to prevent rotation of the ring-shaped thrust bearing part and the outer dust seal, and abuts against an outer peripheral side of the ring-shaped thrust bearing part so as to prevent deformation of the ring-shaped thrust bearing part outward in a radial direction.

16. A slide bearing of claim 15, wherein:
the lower case has a ring-shaped projection formed in a surface facing the upper case;
the ring-shaped thrust bearing part is mounted on the ring-shaped projection of the lower case, and slides on a support object surface formed in the upper case's surface facing the lower case, to support thereby a load applied to the upper case while allowing rotation between the upper case and the lower case; and
the outer dust seal is positioned on an outer peripheral side of the ring-shaped projection of the lower case.

17. A slide bearing of claim 15, wherein:
the slide bearing supports a load of a vehicle applied to a strut type suspension while allowing rotation of a strut assembly of the strut type suspension;
the upper case is mounted to a mounting mechanism for mounting the strut assembly on the vehicle body, in a state that the strut assembly is inserted in the upper case; and
the lower case is fixed to a spring seat for an upper end of a coil spring combined with the strut assembly, in a state that the strut assembly is inserted in the lower case.

18. A slide bearing of claim 15, wherein:
the lubricating sheet comprises:
a ring-shaped thrust sheet which is positioned between the ring-shaped thrust bearing part and the upper case and/or between the ring-shaped thrust bearing part and the lower case; and
a cylindrical radial sheet which is formed integrally with an inner peripheral edge of the ring-shaped thrust sheet and positioned between the radial bearing part and the upper case and/or between the radial bearing part and the lower case.

19. A slide bearing of claim 15, further comprising:
a ring-shaped inner dust seal which is formed integrally with an end of the radial bearing part and abuts against the upper case or the lower case.

20. A slide bearing of claim 15, wherein:
the ring-shaped thrust bearing part of the center plate has a ring-shaped grease groove which is formed in a surface facing the lubricating sheet and functions as a grease reservoir.

\* \* \* \* \*